United States Patent [19]

Suwa

[11] Patent Number: 4,681,987
[45] Date of Patent: Jul. 21, 1987

[54] ELECTRONIC EQUIPMENT HAVING A KEY INPUT FUNCTION

[75] Inventor: Kaname Suwa, Yokohama, Japan

[73] Assignee: Canon Kabushiki Kaisha, Tokyo, Japan

[21] Appl. No.: 837,654

[22] Filed: Mar. 6, 1986

Related U.S. Application Data

[63] Continuation of Ser. No. 567,502, Jan. 3, 1984, abandoned.

[30] Foreign Application Priority Data

Jan. 11, 1983 [JP] Japan ................................ 58-1770
May 6, 1983 [JP] Japan .............................. 58-78344
May 17, 1983 [JP] Japan .............................. 58-84938

[51] Int. Cl.$^4$ ........................ H01H 13/70; H05K 7/10
[52] U.S. Cl. .............................. 200/5 A; 200/159 B; 361/418
[58] Field of Search .......... 174/68.5; 200/5 A, 159 B, 200/292; 361/394, 399, 400, 401, 403, 417, 418, 419, 420, 421

[56] References Cited

U.S. PATENT DOCUMENTS

| | | | |
|---|---|---|---|
| 2,918,287 | 12/1959 | Rosenblum et al. | 361/418 X |
| 3,684,842 | 8/1972 | Boulanger | 200/5 A |
| 3,749,859 | 7/1973 | Webb et al. | 200/5 A X |
| 3,971,902 | 7/1976 | Wulf et al. | 200/5 A |
| 3,977,074 | 8/1976 | Furnival | 174/68.5 X |
| 4,096,577 | 6/1978 | Ferber et al. | 364/712 |
| 4,158,230 | 6/1979 | Washizuka et al. | 200/5 A X |
| 4,365,408 | 12/1982 | Ditzig | 200/5 A X |
| 4,461,934 | 7/1984 | Jabben | 200/5 A |
| 4,569,000 | 2/1986 | Noji | 361/394 |

Primary Examiner—J. R. Scott

[57] ABSTRACT

Electronic equipment having a key input function comprises a circuit structure having an electrical circuit including a plurality of key input contacts formed thereon, a frame arranged on the surface of the circuit structure, and key input buttons arranged one for each of the key input contacts. The frame has holes for each of the key input contacts, an insulative layer adjoining the electrical circuit and a metal layer which is in contact with the electrical circuit, which metal layer is exposed at the holes so that the key input buttons, which fit into the holes, selectively and electrically connect the key input contacts to the metal layer.

12 Claims, 16 Drawing Figures

ELECTRONIC EQUIPMENT HAVING A KEY INPUT FUNCTION

This application is a continuation of application Ser. No. 567,502, filed Jan. 3, 1984, now abandoned.

BACKGROUND OF THE INVENTION

1. Field of the Invention

The present invention relates to electronic equipment having a key input function such as an electronic desk-top calculator.

2. Description of the Prior Art

In a prior art key input device for a desk-top calculator or the like, a pair of input stationary contacts and a movable contact made of conductive rubber located to face the pair of stationary contacts are provided, and the movable contact is moved down by a vertically movable key top to bridge-short the pair of stationary contacts.

Such a structure, however, needs a number of parts such as the key top and the conductive rubber member, and because of the thicknesses of those parts a thin structure desirable for a portable desk-top calculator is not attained.

Further, because of the input system in which the stationary contacts are bridge-shorted by the conductive rubber member, the circuit pattern is complex, the number of manufacturing steps for the printed circuit board is large and a double-sided printed circuit board must be used.

SUMMARY OF THE INVENTION

It is object of the present invention to provide an electronic equipment having a key input function, which is simple in structure and inexpensive.

It is another object of the present invention to provide electronic equipment having a key input function, which is thin in structure and has sufficient strength.

It is other object of the present invention to provide electronic equipment having a key input function, which utilizes a metal layer of a frame as a portion of a circuit pattern.

It is other object of the present invention to provide electronic equipment having a key input function, which utilizes a metal layer of a frame as a support member to support key input means.

It is other object of the present invention to provide electronic equipment having a key input function, which utilizes a metal layer of a frame as a support member to support electronic parts.

It is other object of the present invention to provide electronic equipment having a key input function, which enables a complex key input circuit without imparting a burden to a key input circuit.

Other objects of the present invention will be apparent from the following description of the preferred embodiment of the invention.

DESCRIPTION OF THE PREFERRED EMBODIMENTS

Figure 1:
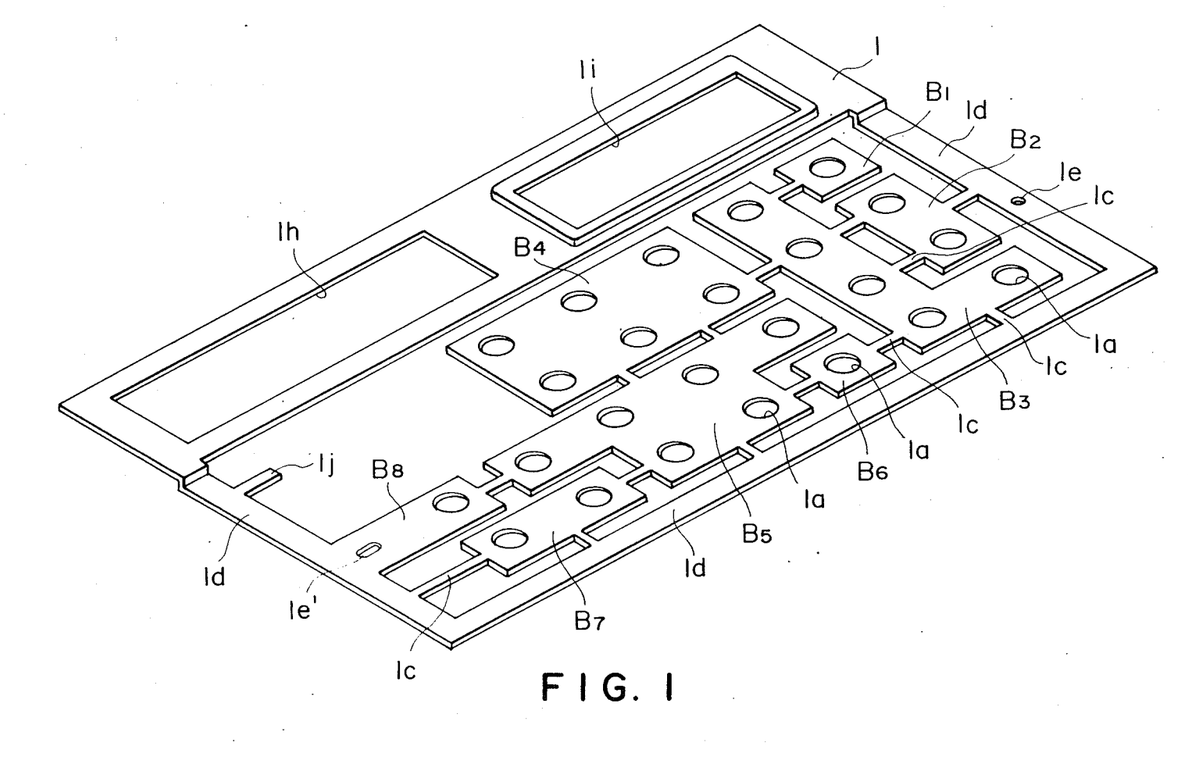
FIG. 1 is a perspective view of a thin metal plate.

FIG. 1 shows a structure of a thin metal plate which is a major element of the present invention. The thin metal plate 1 is made of a highly elastic metal such as phosphor bronze, stainless steel or brass and is formed by etching or pressing. It has a thickness of approximately 50–100 μm.

A plurality of holes 1a are formed in a key input area of the thin metal plate 1 and they define key blocks B1–B8 which are coupled by narrow connecting areas 1c.

They are also coupled to a frame 1d which surrounds the blocks, by the connecting areas 1c. After molding, the plate has a single-plate structure as a whole.

Numerals 1e and 1e' denote positioning holes into which positioning pins of a mold are fitted.

An opening 1h for holding a liquid crystal display and an opening 1i for holding a power supply such as a solar cell are formed adjacent to the key blocks of the thin metal plate 1.

Figure 2:
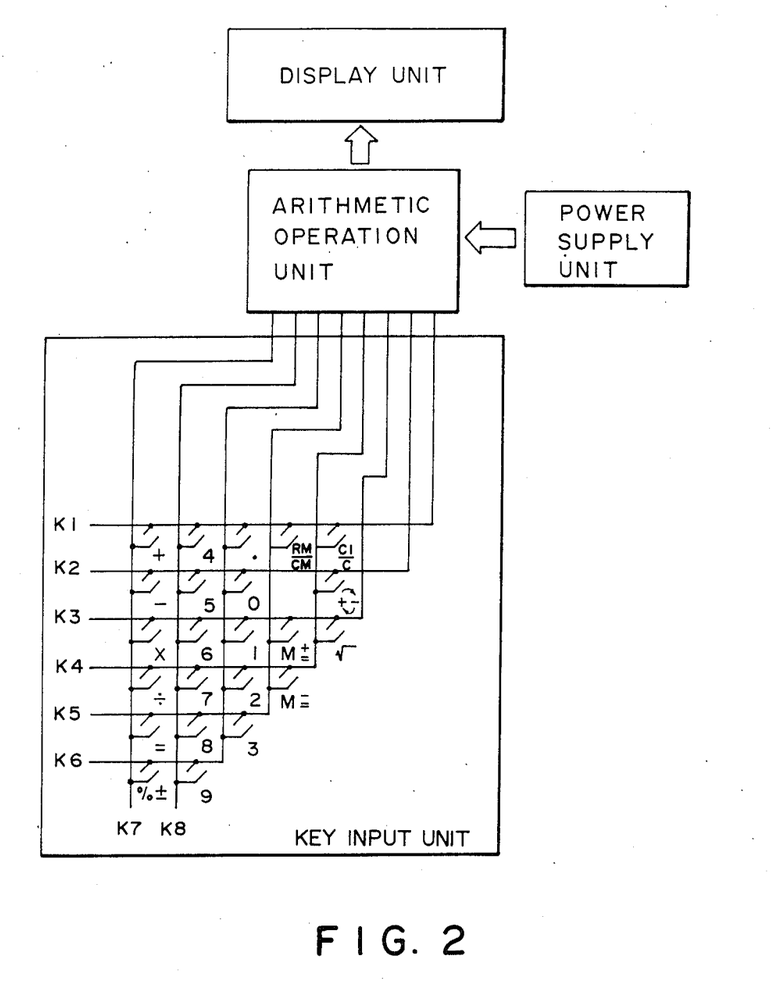
FIG. 2 is a block diagram of a control circuit.

FIG. 2 shows a block diagram of a desk-top calculator. A key input signal in a key input unit of FIG. 2 is produced by shorting any two of signal lines k1–k8. For example, when the signal lines k3 and k6 are shorted, a signal is read into an arithmetic operation unit and "1" is displayed on a display unit.

Figure 5:
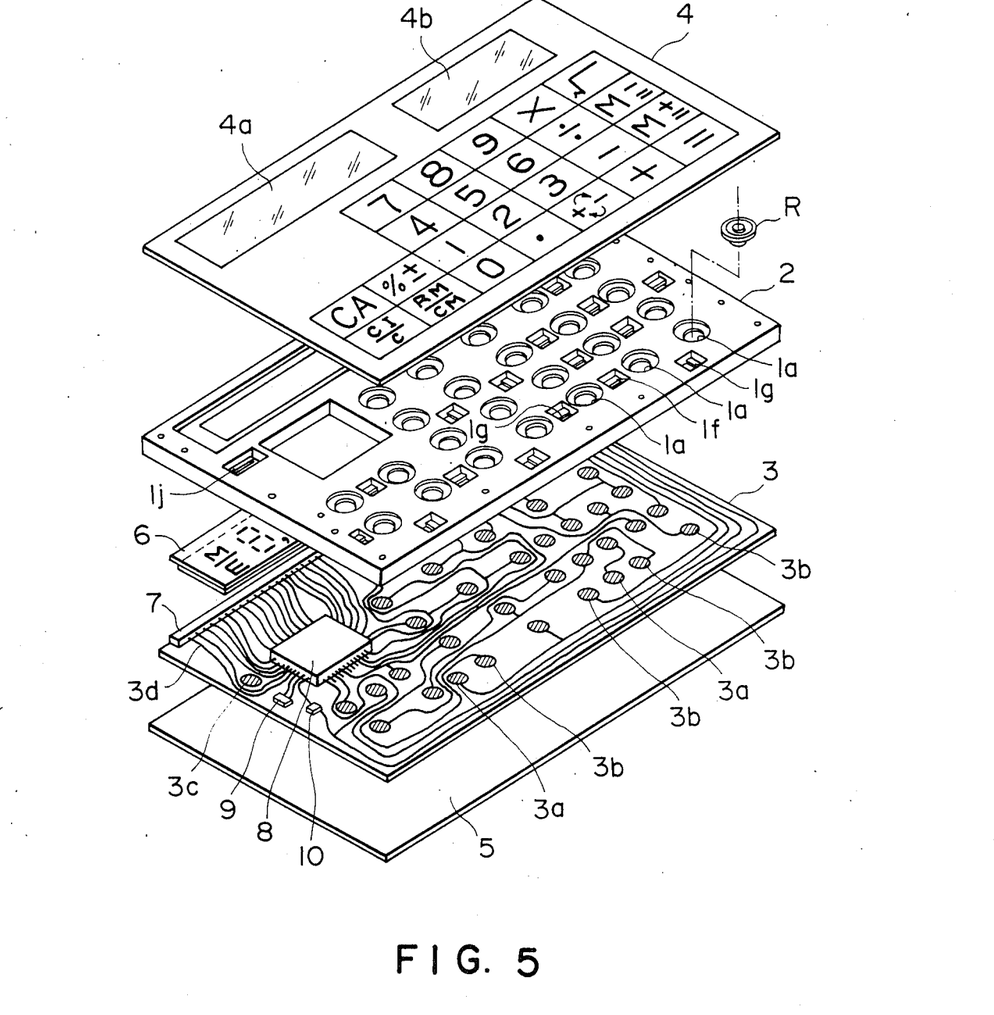
FIG. 5 is a developed perspective view of a desktop calculator.

In order to introduce key input signals ".", "0", "1", "2", "3", "9" and "%±" into the arithmetic operation unit, a desk-top calculator key layout shown on a surface sheet 4, shown in FIG. 5 is employed. It corresponds to the key block B5 shown in FIG. 1.

In FIG. 1, "9" is included in the block B4 for the line K8 in view of the desk-top calculator layout.

The key blocks B1–B8 shown in FIG. 1 are designed to reduce the number of key blocks as much as possible on a single-sided printed circuit board, while taking a circuit pattern adapted to the key input unit of FIG. 2 into consideration.

Figure 3:
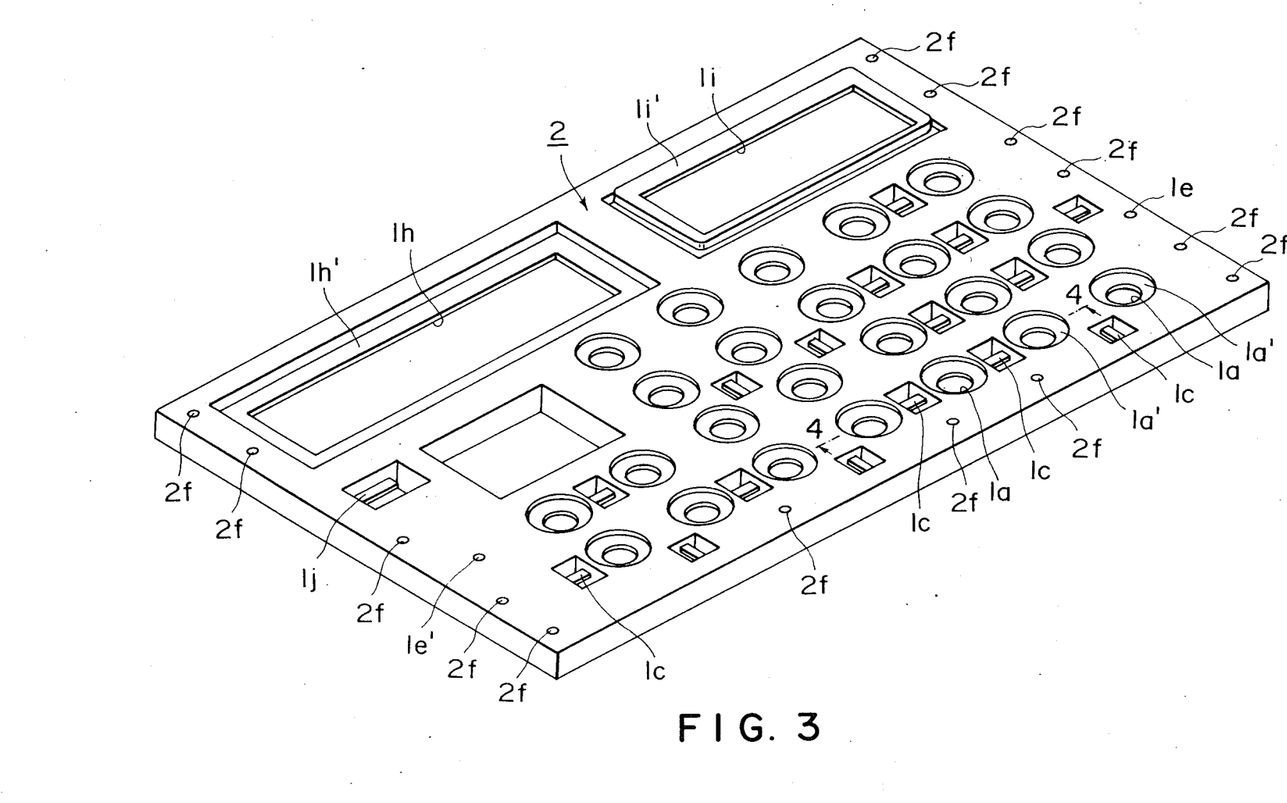
FIG. 3 is a perspective view of a frame in which a thin metal plate is molded.

The thin metal plate 1 is insertion-molded in a frame 2 made of an insulative high molecular material, as shown in FIG. 3.

When a thermoplastic material such as ABS resin, styrol resin or polycarbonate resin is used as the material for the frame 2, the thin metal plate 1 is insertion-molded by injection molding, and when a thermosetting resin such as epoxy resin or phenol resin is used, the thin metal plate 1 is insertion-molded by compression molding.

FIG. 3 shows the insertion-molded plate. The like elements to those shown in FIG. 1 are designated by the like numerals and the metal plate in the areas of the holes 1a and the peripheral areas thereof are exposed from the frame 2.

Figure 4:
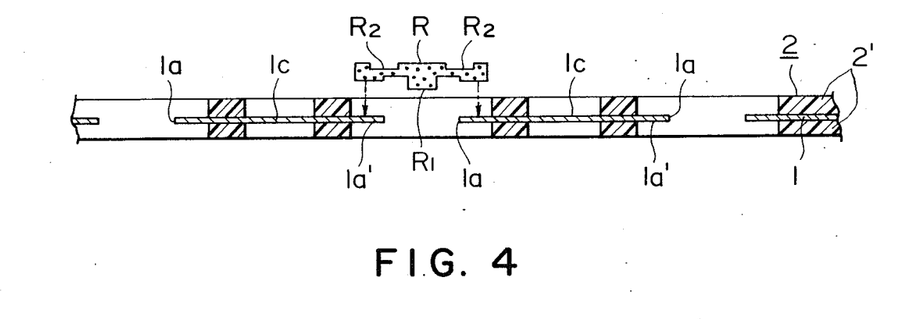
FIG. 4 is an enlarged sectional view taken along a line 4—4 in FIG. 3.

The frame 2 formed by the insertion molding holds the metal layer of the thin metal plate 1 by an insulative layer 2' (see FIG. 4). It is similar to a ferro-concrete structure and has a very high rigidity and is preferable in thinning the desk-top calculator. Holes are formed in the insulative layer 2' of the frame and the metal layer projects toward the holes to form a shelf 1a' for holding the key input means, a shelf 1i' for holding the solar cell and a shelf 1h' for holding the display.

Numeral 1j in FIGS. 1 and 3 denotes a connecting lug for a ground contact to maintain a ground pattern 3c formed on the printed circuit board 3 and the outer frame 1d at the same potential level.

Small holes 2f formed in the outer periphery of the frame 2 are pin holes. Positioning pins of a small diameter having flat ends are formed on the mold to position the thin metal plate 1 thicknesswise of the frame 2 and the flat ends are abutted to the registered positions on the front and back surfaces of the thin metal plate 1. The pin holes are formed when the plate is insertion-molded in such a manner.

Since the thin metal plate is molded while it is positioned and held in the mold, the deformation and the shift of the thin metal plate are prevented even if the molding material is filled into the mold at a high pressure.

Symbol R denotes a movable contact of the key input means, which will be explained in detail later.

Figure 6:
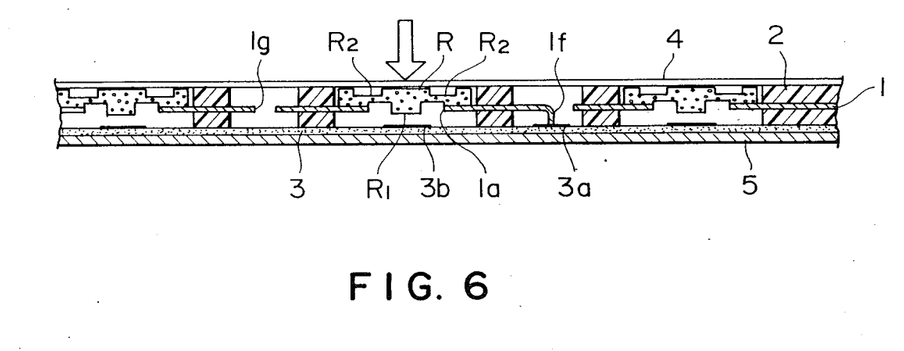
FIG. 6 is a longitudinal sectional view, partially enlarged, to illustrate packaging of a movable contact.

The connecting areas 1c are also exposed and they are cut and separated after the insertion-molding as shown in FIG. 6 so that electrical conduction between the key block areas B1–B8 and the outer frame 1d is disconnected.

Some of the connecting areas 1c are cut away as shown by 1g in FIG. 6, and others are bent so that they are connected to the contact patterns 3a of the printed circuit board 3, as shown by 1f.

Each of the key blocks B1–B8 has at least one bent portion 1f which always contacts to the signal line on the printed circuit board to maintain electrical connection therebetween.

FIG. 5 shows an assembling method of a desk-top calculator which employs the frame 2 formed by separating all connecting areas 1c.

In FIG. 5, numeral 4 denotes a surface sheet which is made of a transparent material having an appropriate softness such as vinylchloride polyester, polycarbonate or urethane. Print is made on a back surface thereof except a display window 4a and a solar cell window 4b. Key symbol marks are printed in the key input area and a type number of the desk-top calculator and other necessary marks are printed. It is bonded to the upper surface of the frame 2 during the assembling step.

Numeral 3 denotes the printed circuit board which is a single-sided copper clad printed circuit board with an electrical circuit pattern etched. The key input stationary contacts 3b which form the key input circuit are formed in one-to-one correspondence to the holes 1a of the thin metal plate 1.

The ground pattern 3c serves to conduct the outer frame 1d to a ground potential. It always contacts the lug 1j of the thin metal plate 1 to prevent malfunction or breakage of the electronic parts due to static electricity discharged from an exterior of the desk-top calculator and stored in the outer frame 1d.

An LSI 8 is soldered to the printed circuit board 3 and forms the arithmetic operation unit shown in the block diagram of FIG. 2.

Electronic parts 9 and 10 such as resistors and capacitors are mounted on the printed circuit board.

Numeral 6 denotes the liquid crystal display which is electrically connected to the connecting pattern 3d on the printed circuit board 3 through a press-contact connector 7.

A reinforcing plate 5 made of highly rigid material is located under the printed circuit board 3. It covers the back surface of the desk-top calculator and is bonded to the peripheries of the lower surfaces of the printed circuit board 3 and the frame 2 to enhance the strength of the desk-top calculator.

The printed circuit board 3 is the single-sided printed circuit board and has no circuit pattern on the surface to which the reinforcing plate is bonded. Accordingly, the reinforcing plate may be an inexpensive and highly rigid metal plate. Numeral 11 in FIG. 7 denotes a polarization plate.

By stacking the various electronic parts on the printed circuit board 3 as shown in FIG. 5, a very thin desk-top calculator is provided.

Figure 7:
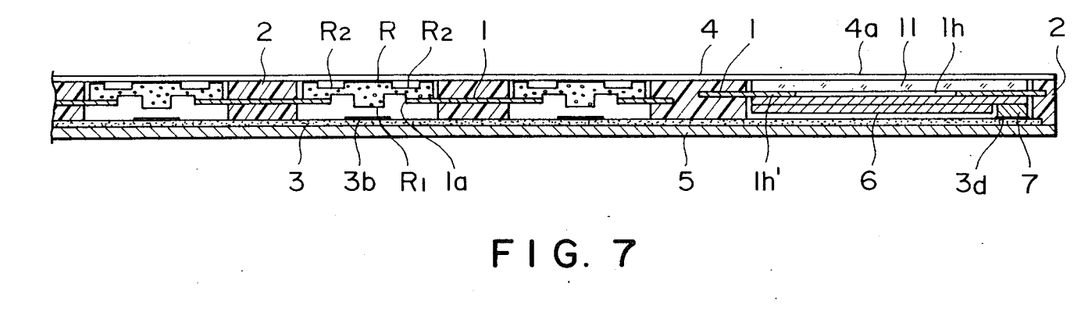
FIG. 7 is a longitudinal sectional view, partially enalrged to illustrate packaging of a display.

FIGS. 6 and 7 show sectional views of the key input unit and the display unit in the stacked state. In FIGS. 6 and 7, symbol R denotes the movable contact made of conductive rubber for the key input unit, in which a projection R1 is formed at a center of the bottom of the contact R, which faces the stationary contact 3b which is the conductive pattern located below the hole 1a of the thin metal plate 1, with a space corresponding to a predetermined stroke therebetween.

A thin area R2 is formed in the movable contact R, the outer periphery and the center of the upper surface of which contact the lower surface of the surface sheet 4. Since the conductive pattern 3a which is a portion of the key signal line contacts to the key blocks B1–B8 through the bent portions 1f, a current is conducted to the exposed area of the thin metal film, and the movable contact R mounted thereon is also in conduction to the selected key signal line. Accordingly, when the surface sheet 4 is depressed by a finger as shown by an arrow in FIG. 6, the surface sheet 4 is flexed and the center area of the movable contact R is elastically deformed through the thin area R2 so that the projection R1 contacts the key input stationary contact 3b and one of the key blocks of the thin metal plate 1 and one of the key input stationary contacts 3b on the printed circuit board 3 are electrically connected. As a result, one of the key input circuits is closed and the key signal is inputted.

Figure 8:
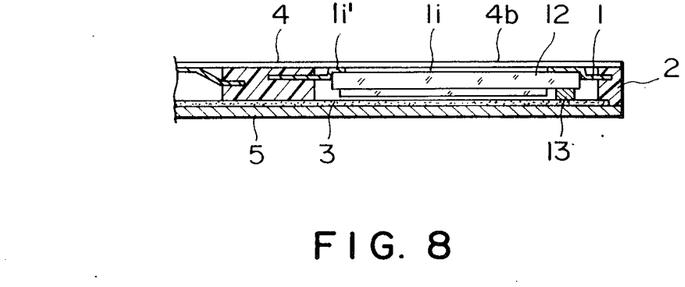
FIG. 8 is a longitudinal sectional view, partially enlarged, to illustrate packaging of a solar cell.

FIG. 8 shows the packaging of the solar cell 12 which supplies a power to the arithmetic operation unit.

The periphery of the opening 1i of the thin metal plate 1 for holding the solar cell has a step of a predetermined width. The amorphous solar cell 12 is held in the shelf 1i' of the opening 1i. The light window 4b of the surface sheet 4 facing the opening 1i has no print or color so that external light is conducted to the solar cell 12 to produce an electromotive force, which is supplied to the conductive pattern on the printed circuit board 3 through the connector 13.

Unlike a conventional primary cell, the solar cell can be semipermanently used and need not be exchanged. Accordingly, it can be packed in a perfectly sealed condition.

The surface sheet briefly described above is now explained in detail.

Figures 9A, 9D:
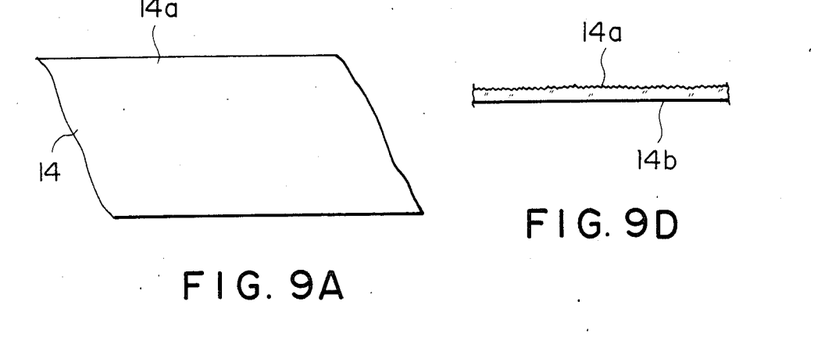
FIGS. 9A–9C illustrate manufacturing steps of a surface sheet.
FIGS. 9D–9F are enlarged sectional views of FIGS. 9A–9C.
Figure 9B:
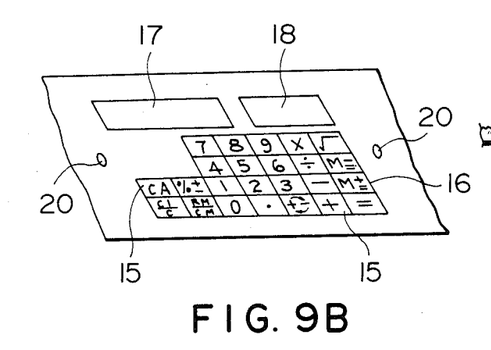
Figures 9C, 9F:
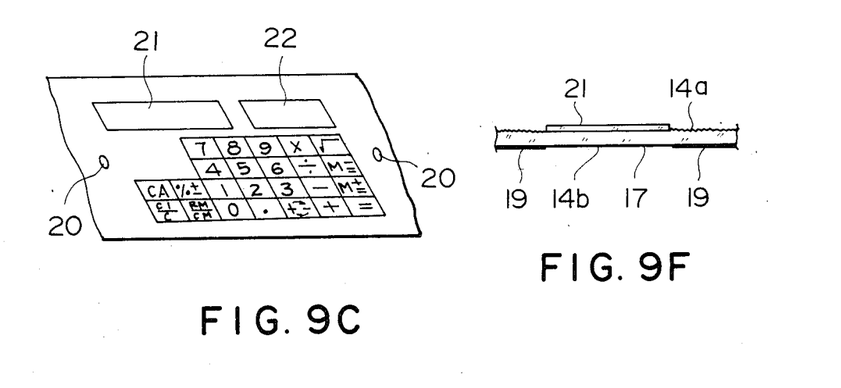
Figure 9E:
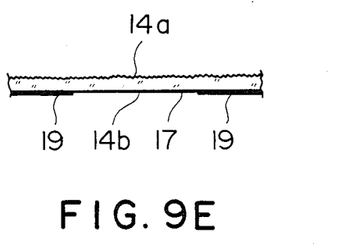

FIGS. 9A-9F show manufacturing steps of the surface sheet. FIGS. 9A and 9D show a sheet material 14. One surface 14a thereof is roughened over an entire surface by matting and the back surface 14b is a polished surface. Key symbol letters 15 and a key frame 16 are printed on the back surface 14b of the sheet as shown in FIGS. 9B and 9E, and a print 19 is made on the entire surface except a display area 17 and a solar cell window area 18. Work reference hole marks 20 are also printed in this step.

In FIGS. 9C and 9F, prints 21 and 22 are made by clear ink on the surfaces of the display area 17 and the solar cell window area 18 on the matted surface 14a.

The ink penetrates into the mat grid of the roughened surface to eliminate roughness. Thus, the diffused reflection of light is suppressed and the light is directed to the display and the solar cell so that the external light is effectively utilized.

When the display is not of a self-light emission type, such as a liquid crystal display, the elimination of the roughness of the roughened surface by the clear ink is very effective.

Unlike the key input area, the display area 17 and the solar cell window area 18 need not be flexible. Accordingly, clear ink which cures after it is dried may be used. Since the print is made on the roughened surface, the deposition of the ink to the sheet is better than when it is printed on the polished surface.

In the next step, the work reference holes are drilled and the sheet is pressed using the work reference holes as positioning guide. In this manner, the surface sheet which is one of the parts of the desk-top calculator is completed.

In accordance with the present surface sheet, the deposition of the ink to the material film is improved and hard ink can be applied to the display area and the solar cell window area so that a damage-free surface sheet is provided.

Further, since the clear ink is printed on a film having one side thereof matted, the selection of the ink is easy and a high viscosity ink need not be used, so that print work for the surface sheet is facilitated.

The packaging of the solar cell briefly described above is now explained in detail.

Figure 10:
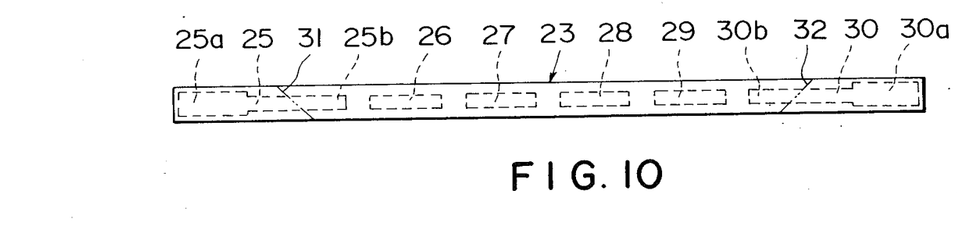
FIG. 10 is a plan view of a heat seal connector of a solar cell unit, and FIG. 11 a plan view of a half-completed product to illustrate a structure of the solar cell unit.

In FIG. 10, numeral 23 denotes a heat seal connector which is a portion of the solar cell 24 and electrically connects the solar cell to the printed circuit board 3. The heat seal connector 23 is of linear, elongated rectangular shape. Conductive patterns 25-30 made of conductive, thermal press-contacting, adhesive material are formed on one surface of the heat seal connector 23. The conductive patterns 25 and 30 at the opposite ends are of elongated rectangular shape having wide outer ends 25a and 30a, respectively. The conductive patterns 26-29 of rectangular shape which are shorter than the conductive patterns 25 and 30 are formed between the conductive patterns 25 and 30 at an equal interval. Insulative, thermal press-contacting, adhesive material is applied to the surface of the heat seal connector 23 except the conductive patterns 25-30.

The heat seal connector 23 is folded over at the inner ends 25b and 30b of the conductive patterns 25 and 30 at the opposite ends along lines 31 and 32 to form a generally U-shaped structure.

Figure 11:
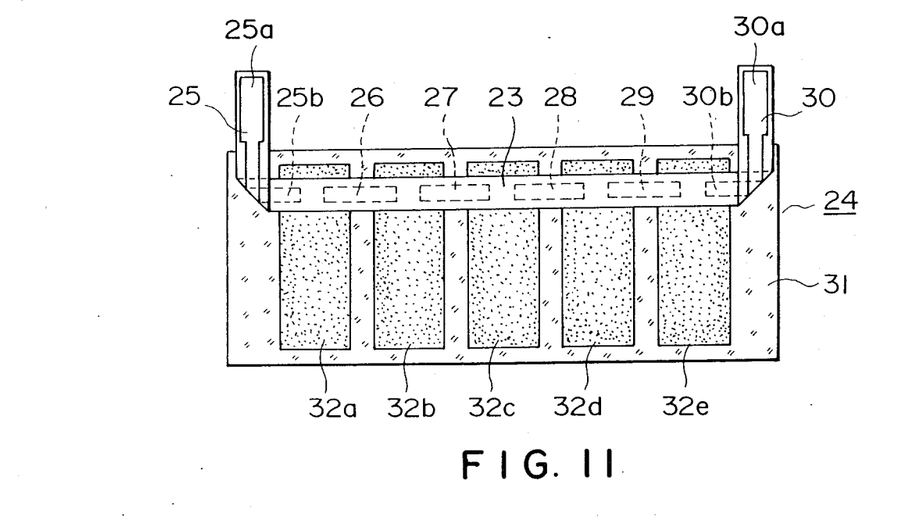

Then, it is overlayed on the solar cells 32a-32e arranged on the base sheet 31 as shown in FIG. 11, and they are heated and pressed to join. The ends 25a and 30a of the conductive patterns 25 and 30 at the opposite ends project above the base sheet 31. The inner ends 25b and 30b of the conductive patterns 25 and 30 at the opposite ends and the opposite ends of the conductive patterns 26-29 therebetween are alternately joined to the positive and negative poles of the solar cells 32a-14 32e. As a result, the solar cells 32a-32e are connected in series.

Then, a transparent film is overlayed on the solar cells 32a-32e and the periphery thereof is joined to the periphery of the base sheet 31 to complete the solar cell unit. The ends 25a and 30a of the conductive patterns 25 and 30 serve as external output terminals. The folded portions of the heat seal connector 23 folded along the lines 31 and 32 are held from the both sides so that they do not return to the original positions.

Since the film sheet of the heat seal connector 23 is of elongated rectangular shape, there is no waste of the material in punching. By changing the positions and the angles of the folding lines 31 and 32 of the heat seal connector, the positions of the ends 25a and 30a of the conductive patterns 25 and 30 which serve as the external output terminals can be changed. When the ends 25a and 30a are arranged on the opposite sides of the base sheet shown in FIG. 11, the heat seal connector 23 is not folded.

In accordance with the present embodiment, the surface of the key input unit does not include unevenness as represented by the key tops and a card-shape thin desktop calculator having a simple external view is provided. It is of sealed structure and water-proof and dust-proof, and is not restricted to use in a particular environment of use.

The thermal deformation and the low mechanical strength of the high molecular material are compensated by the thin metal plate 1 molded in the frame 2. Since the parts exposed to the outer surface of the key input units are flat and simple parts such as display and solar cell, the supply of the parts is easy and automatic assembly work is facilitated.

In the present key input system, since the conductive rubber member is simply contacted to the stationary contact on the printed circuit board unlike the prior art bridge-short contact method, the circuit pattern on the printed circuit board is simplified and it can be formed on the single-sided printed circuit board.

The present invention is not limited to the illustrated embodiments. For example, the key input means may be an integral continuous sheet instead of the separate movable contacts R. The present invention is applicable to not only the desk-top calculator but also any small, thin electronic equipment.

What is claimed is:

1. Electronic equipment having a key input function, comprising:
   printed circuit board means having an electrical circuit including a plurality of stationary contacts (3b), a plurality of connecting contacts (3a) and a connecting pattern for connecting said stationary contacts with said connecting contacts;
   frame means arranged on the surface of said printed circuit board means on which said electrical circuit is formed, said frame means including,
   (1) an insulating layer of an electrically insulative material, said insulating layer having a hole corresponding to each of said stationary and connecting contacts, and (2) a metal layer insertion-molded therein, said metal layer having at least one first portion corresponding to said connecting contact, in one of said holes and in contact with said corresponding connecting contact to provide fixed electrical connection between said first portion and said corresponding connecting contact and at least one second portion corresponding to said stationary contact, in another of said holes, wherein said second portion has an opening smaller than the insulating laver hole; and key input means including a movable contact member associated with said second portion for providing selective electrical connection between said second portion and said corresponding stationary contact, wherein said movable contact member is partially mounted to said metal layer and has another portion abutting said printed circuit board in proximity of said stationary contact, and wherein said frame means is mounted on said printed circuit board means such that said first portion and said second portion are aligned with said corresponding connecting contact and said corresponding stationary contact, respectively, and said movable contact is supported by said metal layer of said frame means.

2. Electronic equipment according to claim 1, wherein said metal layer includes a plurality of key blocks each having at least one said first portion.

3. Electronic equipment according to claim 1, wherein said movable contact member is elastic.

4. Electronic equipment according to claim 1 further comprising a plurality of movable contact members, wherein each of said movable contact members electrically connects one of said stationary contacts to said electrical circuit through one of said first portions and one of said second portions when pressed.

5. Electronic equipment having a key input function comprising:
   printed circuit board means having an electrical circuit including a plurality of stationary contacts (3b), a plurality of connecting contacts (3a) and a connecting pattern for connecting said stationary contacts with said connecting contacts; and
   frame means mounted in confrontation to said circuit board means having,
   (1) a metal plate having, in a first area, openings respectively corresponding to each of said stationary contacts and, in a second area, a hole for mounting a power supply therein and a hole for mounting a display therein and
   (2) a member of electrically insulative material having openings larger that said first mentioned openings, a hole larger than said power supply mounting hole and a hole larger than said display mounting hole;
   wherein said metal plate is insertion-molded into said member and so that the margin areas defining said openings and holes of said metal plate are exposed and said power supply and said display are supported between said circuit board means and said frame.

6. Electronic equipment according to claim 5, wherein said metal plate has a difference in level between said first area and second area.

7. Electronic equipment according to claim 5, wherein a solar cell is mounted in said power supply mounting hole and a liquid crystal display is mounted in said display mounting hole.

8. Electronic equipment according to claim 6, wherein a solar cell is mounted in said power supply mounting hole and a liquid crystal display is mounted in said display mounting hole.

9. Electronic equipment according to claim 5, further including movable contact members each provided in one of said openings of said metal plate.

10. Electronic equipment according to claim 6, further including movable contact members each provided in one of said openings of said metal plate.

11. Electronic equipment having a key input function comprising:
   printed circuit board means having an electrical circuit including a plurality of stationary contacts (3b), a plurality of connecting contacts (3a) and a connecting pattern for connecting said stationary contacts with said connection contacts; and
   frame means mounted in confrontation to said circuit means having,
   (1) a metal plate comprising a first member (B4) including first openings arranged to face a first group of said stationary contacts, a second member (B5) including second openings arranged to face a second group of said stationary contacts, a frame member (1d) for enclosing said first and second member, first connection members (1c, 1f) for, in a position facing said plurality of connecting contacts, connecting said first member to said second member or for connecting said frame member to said first or second member, and second connection members (1c, 1g) for, in a position not facing said plurality of connecting contacts and stationary contacts, connecting said first member to said second member or for connecting said frame member to said first or second member, wherein said first and second members, frame member, first connection members and second connection members are integrally formed, and
   (2) an insulative member of electrically insulative material having third openings for exposing the marginal area defining said first and second openings formed on said first and second members and fourth openings for exposing the marginal area defining said first and second connection members, wherein said third openings are larger than said first and second openings of said metal plate and wherein said metal plate is insertion-molded into said insulative member and wherein said first and second connection members are cut in said openings of said insulative member, wherein each of said first connection members is cut into two pieces one of which is connected to said connecting contact and each of said second connection members is cut into two pieces.

12. Electronic equipment according to claim 11, wherein said third and fourth openings of said insulative member for exposing said vicinity of said first and second openings of said metal plate and for exposing said connection members are round and angular in shape, respectively.

* * * * *

UNITED STATES PATENT AND TRADEMARK OFFICE
CERTIFICATE OF CORRECTION

PATENT NO. : 4,681,987  
DATED : July 21, 1987  
INVENTOR(S) : KANAME SUWA

Page 1 of 2

It is certified that error appears in the above-identified patent and that said Letters Patent is hereby corrected as shown below:

AT [56] IN THE REFERENCES

Insert --Attorney, Agent, or Firm - Fitzpatrick, Cella, Harper & Scinto--.

COLUMN 1

Line 34, "is object" should read --is an object--.

COLUMN 2

Line 4, "enalrged to" should read --enlarged, to--.
    Line 13, "FIG. 11a" should read --FIG. 11 is a --.

COLUMN 4

Line 38, delete "to".

COLUMN 6

Line 7, "32a-14" should read --32a---.
    Line 34, "environment of use." should read --environment.--.
    Line 41, delete "work".

COLUMN 7

Line 10, "laver" should read --layer--.

UNITED STATES PATENT AND TRADEMARK OFFICE
CERTIFICATE OF CORRECTION

PATENT NO. : 4,681,987
DATED : July 21, 1987
INVENTOR(S) : KANAME SUWA

It is certified that error appears in the above-identified patent and that said Letters Patent is hereby corrected as shown below:

COLUMN 8

Line 21, "connection" should read --connecting--.
Line 30, "member" should read --members--.

Signed and Sealed this

Seventh Day of June, 1988

Attest:

DONALD J. QUIGG

Attesting Officer    Commissioner of Patents and Trademarks